(12) United States Patent
Farkas et al.

(10) Patent No.: US 9,183,001 B2
(45) Date of Patent: Nov. 10, 2015

(54) SIMULATION OF STATIC MEMBERS AND PARAMETERIZED CONSTRUCTORS ON AN INTERFACE-BASED API

(75) Inventors: Shawn Farkas, Kirkland, WA (US); Jesse D. Kaplan, Sammamish, WA (US); Ladislav Prosek, Redmond, WA (US); Richard M. Byers, Waterloo (CA); Ryan A. Byington, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 13/350,552

(22) Filed: Jan. 13, 2012

(65) Prior Publication Data
US 2013/0066622 A1 Mar. 14, 2013

Related U.S. Application Data

(60) Provisional application No. 61/533,747, filed on Sep. 12, 2011.

(51) Int. Cl.
*G06F 9/45* (2006.01)
*G06F 9/44* (2006.01)

(52) U.S. Cl.
CPC ..................... *G06F 9/443* (2013.01)

(58) Field of Classification Search
CPC .............. G06F 9/44; G06F 9/45; G06F 8/20; G06F 8/30; G06F 11/362; G06F 9/541; G06F 9/465; G06F 9/443; G06F 9/445; G06F 8/423; G06F 8/443

USPC .......................................................... 703/22
See application file for complete search history.

(56) References Cited

U.S. PATENT DOCUMENTS

| | | | | |
|---|---|---|---|---|
| 7,730,465 | B2 * | 6/2010 | Sutter et al. | 717/141 |
| 7,844,947 | B2 * | 11/2010 | Irving et al. | 717/120 |
| 8,135,796 | B1 * | 3/2012 | Slaughter et al. | 709/217 |
| 2002/0032804 | A1 | 3/2002 | Hunt | |

(Continued)

FOREIGN PATENT DOCUMENTS

CN 1664779 A 9/2005

OTHER PUBLICATIONS

Nishimori et a.("Join Token-Based Event Handling: A Comprehensive Framework for Game Programming",SLE 2011, pp. 119-138 ).*

(Continued)

*Primary Examiner* — Omar Fernandez Rivas
*Assistant Examiner* — Iftekhar Khan
(74) *Attorney, Agent, or Firm* — Kevin Sullivan; Aaron Hoff; Micky Minhas (57) ABSTRACT

Embodiments are directed to providing a simulation of a type-level construct on an interface instance and to maintaining a token-based event handling system. In one scenario, a computer system instantiates an interface instance that includes an instance object and multiple instance members. The computer system also instantiates a separate typed object which is configured to maintain one or more simulated type-level parameterized constructors. The computer system then associates the instantiated interface instance with the separate typed object. The typed object routes method invocations from the interface instance to various simulated type-level parameterized constructors and static members of the type.

20 Claims, 4 Drawing Sheets

(56) References Cited

U.S. PATENT DOCUMENTS

| | | | |
|---|---|---|---|
| 2003/0014555 A1 | 1/2003 | Cierniak | |
| 2004/0268309 A1 | 12/2004 | Grover et al. | |
| 2005/0005261 A1* | 1/2005 | Severin | 717/108 |
| 2005/0086648 A1 | 4/2005 | Andrews et al. | |
| 2005/0246716 A1* | 11/2005 | Smith et al. | 719/315 |
| 2005/0267935 A1* | 12/2005 | Gandhi et al. | 709/203 |
| 2006/0184661 A1* | 8/2006 | Weisman et al. | 709/224 |
| 2008/0256549 A1* | 10/2008 | Liu et al. | 718/106 |
| 2009/0234804 A1 | 9/2009 | Whitechapel et al. | |
| 2010/0042982 A1* | 2/2010 | Aharoni et al. | 717/151 |
| 2010/0162260 A1 | 6/2010 | Ibrahim | |
| 2010/0235810 A1 | 9/2010 | Campbell et al. | |
| 2010/0299659 A1 | 11/2010 | Kirshnaswamy et al. | |

OTHER PUBLICATIONS

Nathan, Adam, "Managing COM Object Lifetime in a Garbage-Collected Environment", Retrieved on: Sep. 21, 2011, Available at: http://www.informit.com/articles/article.aspx?p=26993.

Pattison, Ted, "Implementing Callback Notifications Using Delegate", Retrieved on: Sep. 21, 2011, Available at: http://msdn.microsoft.com/en-us/magazine/cc188909.aspx.

"Chapter 5 Application Binary Interfaces and Versioning", Retrieved on: Sep. 21, 2011, Available at: http://download.oracle.com/docs/cd/E19082-01/819-0690/6n33n7fac/index.html.

"Exporting C++ Classes from a DLL", Retrieved on: Sep. 21, 2011, Available at: http://eli.thegreenplace.net/.

"Itanium C++ ABI", Retrieved on: Sep. 21, 2011, Available at: http://www.swag.uwaterloo.ca/acd/docs/ItaniumC++ABI.htm.

Atkinson, et al., "ABI Compatibility Through a Customizable Language", In Proceedings of Ninth International Conference on Generative Programming and Component Engineering, Oct. 10-13, 2010, 10 pages.

"First Office Action and Search Report Issued in Chinese Patent Application No. 201210335226.8", Mailed Date: May 6, 2015, 12 Pages.

"Supplementary Search Report Issued in European Patent Application No. 12831917.5", Mailed Date: Mar. 16, 2015, 8 Pages.

* cited by examiner

SIMULATION OF STATIC MEMBERS AND PARAMETERIZED CONSTRUCTORS ON AN INTERFACE-BASED API

CROSS-REFERENCE TO RELATED APPLICATIONS

This application claims the benefit of and priority to U.S. Provisional Application No. 61/533,747, entitled "SIMULATION OF STATIC MEMBERS AND PARAMETERIZED CONSTRUCTORS ON AN INTERFACED BASED API", filed on Sep. 12, 2011, which is incorporated by reference in its entirety herein.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

These software applications are typically designed and created using an integrated development environment (IDE). The IDE allows the developer access to different elements and constructs that facilitate the creation of a software program. Different IDEs may allow the use of different programming languages. For instance, some IDEs are more suited to object-oriented software development. These IDEs may have editors, compilers, debuggers, class browsers, object inspectors and other tools that allow a developer to control and develop each aspect of an application. In some cases, object-oriented IDEs allow developers to construct objects by providing parameter information as well as allow using static members with certain types.

BRIEF SUMMARY

Embodiments described herein are directed to providing a simulation of a type-level construct on an interface instance and to maintaining a token-based event handling system. In one embodiment, a computer system instantiates an interface instance that includes an instance object and multiple instance members. The computer system also instantiates a separate typed object which is configured to maintain one or more simulated type-level parameterized constructors. The computer system then associates the instantiated interface instance with the separate typed object. The typed object routes method invocations from the interface instance to various simulated type-level parameterized constructors and static members of the type.

In another embodiment, a computer system maintains a token-based event handling system. The computer system instantiates a table of event subscriptions for a plurality of programming objects, the table being configured to map tokens to event subscribers and the events to which they are subscribed. The table of event subscriptions maintains a weak reference to the subscriber for each of the event subscriptions. As such, the subscriptions are tracked without the table of event subscriptions forcing the subscriber to stay alive. The computer system then determines that at least one event no longer has any subscriptions and, based on the determination, removes the subscription from the table of event subscriptions. When all the event subscriptions tracked by the table are removed, the table of event subscriptions can then be freed as well.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Embodiments described herein are directed to providing a simulation of a type-level construct on an interface instance and to maintaining a token-based event handling system. In one embodiment, a computer system instantiates an interface instance that includes an instance object and multiple instance members. The computer system also instantiates a separate typed object which is configured to maintain one or more simulated type-level parameterized constructors. The computer system then associates the instantiated interface instance with the separate typed object. The typed object routes method invocations from the interface instance to various simulated type-level parameterized constructors and static members of the type.

In another embodiment, a computer system maintains a token-based event handling system. The computer system instantiates a table of event subscriptions for a plurality of programming objects, the table being configured to map tokens to event subscribers and the events to which they are subscribed. The table of event subscriptions maintains a weak reference to the subscriber for each of the event subscriptions. As such, the subscriptions are tracked without the table of event subscriptions forcing the subscriber to stay alive. The computer system then determines that at least one event no longer has any subscriptions and, based on the determination, removes the subscription from the table of event subscriptions. When all the event subscriptions tracked by the table are removed, the table of event subscriptions can then be freed as well.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Figure 1:
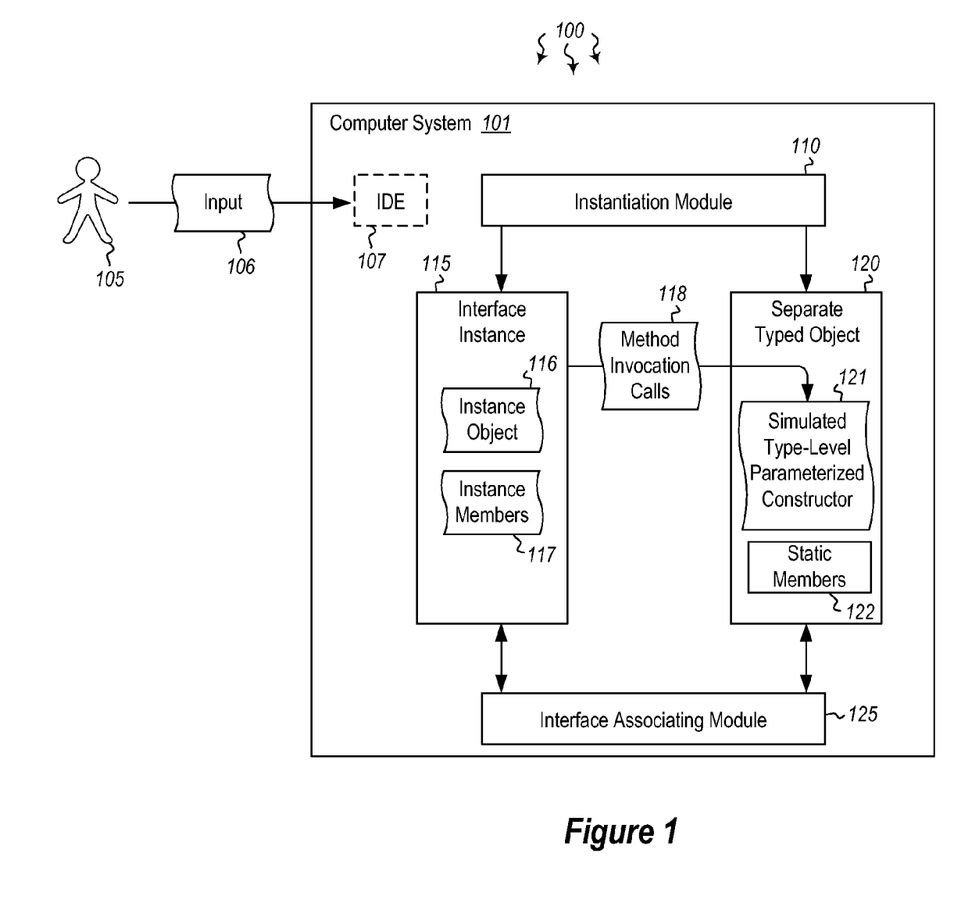
FIG. 1 illustrates a computer architecture in which embodiments of the present invention may operate including providing a simulation of a type-level construct on an interface instance and maintaining a token-based event handling system.

FIG. 1 illustrates a computer architecture 100 in which the principles of the present invention may be employed. Computer architecture 100 includes computer system 101. Computer system 101 may be any type of local or distributed computer system, including a cloud computing system. The computer system may include various different modules for performing a variety of different tasks. For instance, the instantiation module 110 may be configured to instantiate interface instances (e.g. 115), typed objects (e.g. 120) or other elements. The computer system may be configured to run an integrated development environment (IDE) that allows a program developer to develop applications. The IDE 107 may receive user inputs 106 from the developer 105, indicating various functionality that is to be provided by the IDE, as well as other modules of the computer system. The functionality of these modules will be described further below.

In general, embodiments described herein allow a runtime to associate an interface instance 115 with a type 120, which can then be used to simulate the effect of parameterized constructors 121 as well as static members of the type. Similarly, the runtime can provide an instance of an object 120 that can be used to access type-level operations on types supplied by the runtime.

Thus, embodiments allow the association of a set of interface instances with a type, providing a runtime the ability to simulate type level operations over the top of an interface-based application binary interface. In some cases, other implementations used to adapt interface based application binary interfaces to object oriented systems restricted the kinds of operations that could be performed by runtimes to instance methods. Embodiments described herein provide static members and constructors with parameters.

A runtime may associate one or more instances of interfaces 115 with a type 120. When the runtime executes the constructor of a type that has parameters, the runtime scans the interfaces for a method which has a matching set of parameters and returns an instance of the type in question. The constructor is then simulated by the runtime by dispatching to the selected method, using the return value as the new object. This is in contrast to other techniques for constructing runtime callable wrappers, which simply simulate construction by calling a single, well known API.

Embodiments also allow a runtime to simulate static members by using interface instances associated with a type. Each static member is associated with a member on an interface which is tied to the type defining the static members. When the runtime attempts to execute a static member, the access is instead redirected to its associated interface. This redirection allows the runtime to simulate the presence of static members over the top of an application binary interface which requires interface based calls. At least in some cases, other versions of runtime callable wrapper technology do not allow for simulation of static members, requiring that the runtime expose object models that had only instance members instead.

In a similar vein, the runtime can simulate type-level operations as instance operations on an object supplied by the runtime to the application binary interface. The runtime will create a single type object which implements interfaces for parameterized constructors and static members on the type. When calls are dispatched to the interface methods representing parameterized constructors, the runtime dispatches the call to the constructor which has the same method parameters as the called interface method and returns the result. When calls are made to interface methods representing static members of a type, the runtime provided object invokes the static members of the type in question to satisfy the interface request.

Embodiments also describe different methods which a runtime may use to manage the lifetime of runtime callable wrappers which act as event sources. These methods may be used to keep an event source wrapper alive by the runtime only as long as it is needed by event subscribers hosted within the runtime.

In one embodiment, the runtime maintains a set of weak references to each event subscriber tied to the runtime callable wrapper for the event source. These references are maintained in a table of event subscriptions. As the event source is subscribed to, a weak reference to the subscriber is added to the set. Similarly, when an event subscription is terminated, its corresponding weak reference is removed from the set of active subscribers. When the runtime believes that it can finalize the event subscription table, it first checks the set of weak references to see if any are still alive. If any of these references are alive, the event subscription table associated with the event subscription table is no longer considered a candidate for finalization by the runtime.

Another lifetime management technique for event handling is implemented by a runtime maintaining a reference count for each event source runtime callable wrapper. Referencing this event source from the system increments this reference count. When this reference count is non-zero, the runtime maintains a strong reference to the event source, preventing it from being eligible for garbage collection. When the reference count hits 0, the runtime releases its strong reference to the event source. The event subscription table associated with the event source is then allowed to become eligible for garbage collection when it is no longer needed by the running program.

Moreover, embodiments provide a way for a runtime to simulate a delegate object over an interface which represents a callback method. Other implementations may require that the delegate abstraction be broken and client code make callbacks directly onto the application binary interface (ABI). As described herein, in order to simulate a delegate, the runtime identifies a callback method on the interface instance. It then creates a delegate type with an "invoke" method that has an identical signature to the signature of the callback method. When the delegate is invoked, either directly or via an event, the runtime forwards the delegate to the underlying ABI method. The result of the callback method is then returned as the result of the delegate invocation. In this way, the runtime provides a delegate API experience over an interfaced ABI.

Similarly, a runtime may provide an interface for ABI callers to consume which maps to an instance of a delegate hosted by the runtime. The runtime will create an object that implements a new interface with a single "invoke" method which has a signature matching the delegate's signature. When an external caller makes a call onto the object's interface method, the runtime invokes the delegate that it is wrapping. The results of the delegate invocation are then passed as the result of the method invocation. This allows the runtime to provide an interface based ABI over delegates. These concepts will be explained further below with regard to methods 200 and 300 of FIGS. 2 and 3, respectively.

Figure 2:
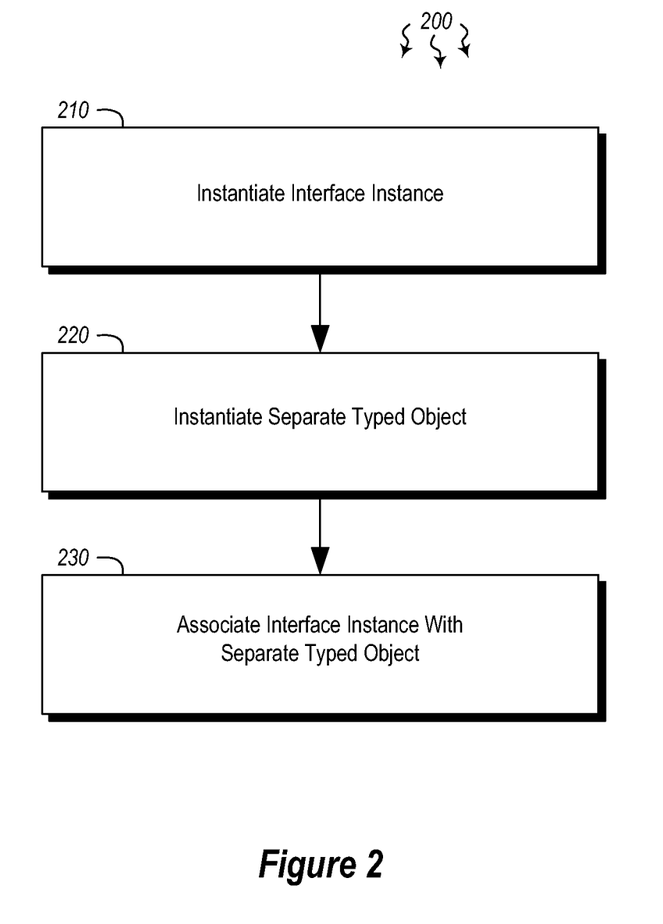
FIG. 2 illustrates a flowchart of an example method for providing a simulation of a type-level construct on an interface instance.
Figure 3:
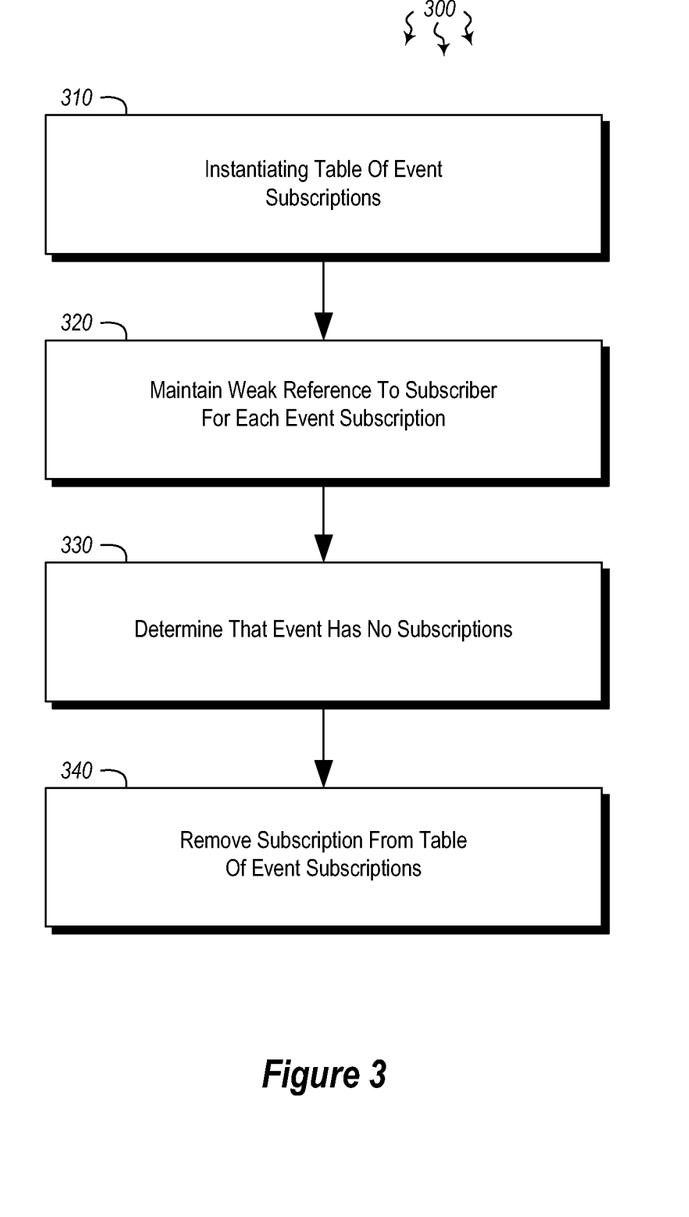
FIG. 3 illustrates a flowchart of an example method for maintaining a token-based event handling system.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing a simulation of a type-level construct on an interface instance. The method 200 will now be described with frequent reference to the components and data of environment 100.

Method 200 includes an act of instantiating an interface instance comprising an instance object and one or more instance members (act 210). For example, instantiation module 110 may instantiate interface instance 115. Although only one interface instance is shown in FIG. 1, it will be understood that substantially any number of interface instances may be instantiated. The instance 115 includes at least one instance object 116, as well as one or more instance members 117. These instance members may, at least in some cases, comprise static members. Each instantiated interface instance may include a different number of instance objects and/or (static) instance members, depending on implementation. Once instantiated, the interface instance may be implemented to simulate type-level operations.

Method 200 further includes an act of instantiating a separate typed object 120, which is configured to maintain one or more simulated type-level parameterized constructors 121 (act 220), and an act of associating the instantiated interface instance 115 with the separate typed object 120, where the separate typed object is configured to route method invocations 118 from the interface instance to one or more simulated type-level parameterized constructors 121 and static members 122 of the type (act 230). In some cases, as mentioned above, multiple different interface instances may be instantiated by module 110, either sequentially, or simultaneously.

Each of these instantiated interface instances may be associated (e.g. by interface associating module 125) with the separate typed object 120 to provide a unified view to application developers implementing the interface instances. Thus, for instance, if developer 105 is developing an application using IDE 107, the interface instances used in the IDE may be associated with the separate typed object in order to provide a unified view for the developer.

In some embodiments, the instance members 117 of the interface instance may be routed to the simulated type-level parameterized constructors 120. These simulated type-level parameterized constructors may include one or more type-level operations. These operations may be used by the interface instances. The simulated type-level parameterized constructors may also be used to simulate delegate objects over the interface instance. The delegate objects may represent various callback methods.

As mentioned above, the simulated type-level parameterized constructors 121 may be matched with native methods using signatures. Native methods, as used herein, refer to methods that are natively accessible by computer system 101, or by the operating system of computer system 101. The simulated type-level parameterized constructors and native methods are matched in order to detect the appropriate interface instance to dispatch method calls against. Then, upon receiving a call to an interface method representing static members 122 of a specified type, the separate typed object 120 invokes the instance members 117 of the specified type to satisfy the interface method call. The static members may be simulated by the separate typed object 121. Any runtime attempts to execute the static members may be redirected to the static members' associated interface instance 115. The redirection allows the runtime to simulate the presence of static members over the top of the interface instance that implements interface-based calls 118. The runtime may thus identify a callback method on the interface instance, create a delegate type with an invoke method that has an identical signature to the signature of the callback method, determine that the delegate has been invoked, forwarding the callback method to an application binary interface (ABI) method, and return the result of the callback method as the result of the delegate invocation. As such, the runtime provides a delegate API experience over an interfaced ABI.

Accordingly, embodiments described herein can provide a simulation of a type-level construct on an interface instance. As such, parameterized constructors and static methods can be provided by having a separate typed-object which maintains the type-level constructs. Individual interface instances can then route their method invocations through the simulated type-level parameterized constructors.

FIG. 3 illustrates a flowchart of a method 300 for maintaining a token-based event handling system. The method 300 will now be described with frequent reference to the components and data of environment 400 of FIG. 4.

Figure 4:
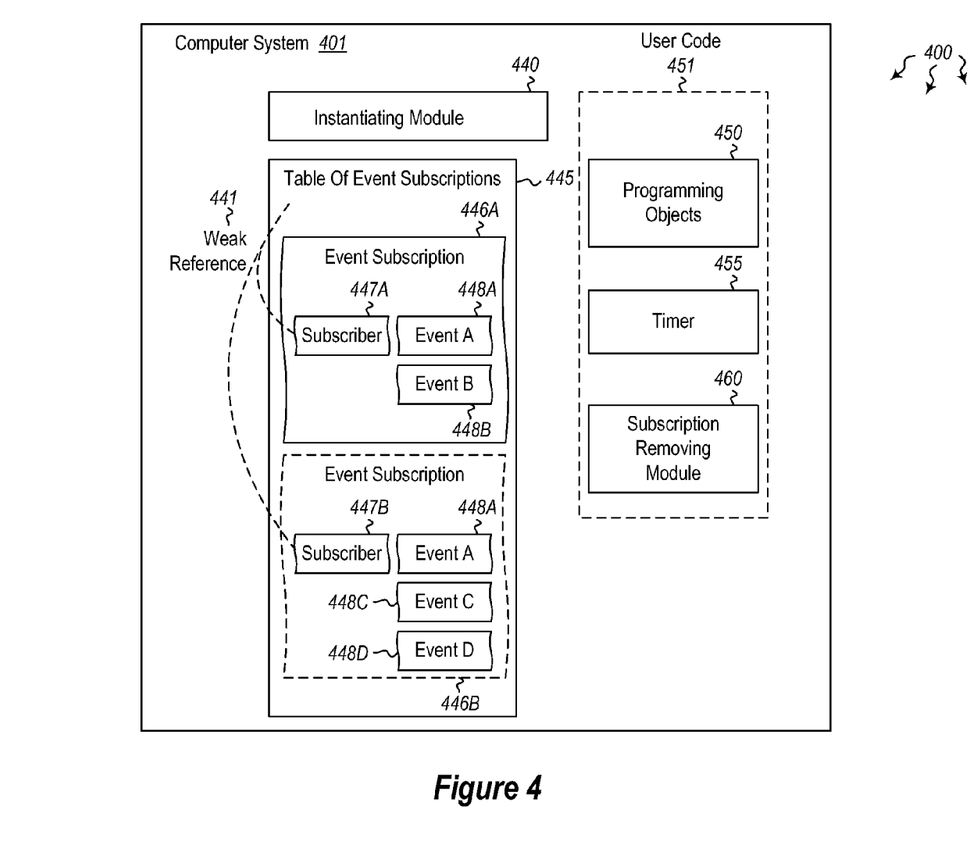
FIG. 4 illustrates an embodiment of the present invention in which event subscriptions are maintained in a token-based event handling system.

Method 300 includes an act of instantiating a table of event subscriptions for a plurality of programming objects, the table being configured to map one or more tokens to event subscribers and the events to which they are subscribed (act 310). For example, instantiating module 440 may establish and maintain table of event subscriptions 445 as part of a token-based event handling system. The table of event subscriptions may include multiple different event subscriptions (e.g. 446A and 446B) for different programming objects 450. As such, when an even occurs on a specific programming object, the subscriber to that event is notified. The event subscriptions have subscribers (447A/447B) and associated events for each subscriber. For example, subscriber 447A in event subscription 446A is subscribed to event A (448A) and event B (448B). Event subscriber 447B is subscribed to event A (448A), event C (448C) and event D (448D). As will be understood, each subscriber may be subscribed to substantially any number of different events.

Method 300 also includes an act of the table of event subscriptions maintaining a weak reference to the subscriber for each of the event subscriptions, such that the subscriptions are tracked without the table of event subscriptions forcing the subscriber to stay alive (act 320). The table of event subscriptions 445 may establish and maintain a weak reference 441 to the subscriber (447A/447B) for each event subscription (446A/446B). The weak reference tracks the subscriptions without forcing the subscriber to stay alive (hence, identifying the reference as a "weak" reference). Accordingly, the table of event subscriptions will not force the subscriber to stay alive in order to maintain the reference.

In some cases, a timer 455 may be used to determine that the subscription has remained alive for a specified amount of time. Then, based on the determined amount of time, the subscription may be removed. In other cases, a developer may simply remove a subscription to an event, or the developer may use subscription removing module 460 to remove the programming object to which an event is bound. Regardless of the reason, an event may reach a point where it no longer has any subscribers. At that point, the table of event subscriptions may determine that the event does not have any subscriptions (act 330).

During this subscription removal, the table of event subscriptions does not keep either the subscriber or the event alive. Moreover, at least in some cases, the table of event subscriptions may automatically remove itself upon determining that there are no more subscriptions to track for a specified event. It should also be noted that, at least in some embodiments, the programming objects, the timer 455 and the subscription removing module 460 may be implemented in user-code 451, as opposed to the instantiating module 440 and table of event subscriptions which are implemented in system-code. However, it will be noted that each portion of computer architecture 400 may be implemented in substantially any type of hardware and/or software environment.

In some embodiments, reference counting may be implemented in lieu of the weak reference. This technique for event handling is implemented by a runtime maintaining a reference count for each event source runtime callable wrapper. In such cases, a strong reference may be implemented between the subscriber and the event the subscriber is subscribing to. Whenever an event subscriber is added to an event source, the reference count is incremented, while removing a subscriber decrements the reference count. The strong reference to the event source is automatically maintained when it is determined that the reference count is non-zero. This strong reference prevents the event source from being garbage collected. When the reference count is determined to be zero, the runtime releases its strong reference to the event source. This allows the event source to be eligible for garbage collection when no longer needed by its associated running program.

Accordingly, methods, systems and computer program products are described which provide a simulation of a type-level construct on an interface instance. Moreover, methods, systems and computer program products are provided which maintain a token-based event handling system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, a computer-implemented method for providing a simulation of a type-level construct on an interface instance, the method comprising:
    instantiating an interface instance comprising an instance object and one or more instance members;
    instantiating a separate typed object which is configured to maintain one or more simulated type-level parameterized constructors, the simulated type-level parameterized constructors having associated parameters;
    scanning a plurality of interface instances to identify an interface instance that provides a method having a specified set of parameters, the identified method being matched to the parameters of the simulated type-level parameterized constructors to determine an appropriate interface instance to dispatch method calls against;
    associating the instantiated interface instance with the separate typed object, wherein the separate typed object is configured to route method invocations for the identified method from the interface instance to one or more simulated type-level parameterized constructors and static members of the type; and
    simulating a type-level parameterized constructor by redirecting attempts to execute the static members to the static members' associated interface instance, the redirection allowing a runtime to simulate the presence of static members over the top of the interface instance associated with the separate typed object by at least:
        identifying a callback method on the interface instance;
        creating a delegate type with an invoke method that has an identical signature to a signature of the callback method;
        upon determining that the delegate has been invoked, forwarding the callback method to an application binary interface (ABI) method; and
        returning the result of the callback method as the result of the delegate invocation, such that the runtime provides a delegate API experience over an interfaced ABI.

2. The method of claim 1, wherein the interface instance is implemented to simulate one or more type-level operations.

3. The method of claim 1, wherein a plurality of different interface instances are associated with the separate typed object to provide a unified view to application developers implementing the interface instances.

4. The method of claim 1, wherein the instance members of the interface instance are routed to the simulated type-level parameterized constructors.

5. The method of claim 4, wherein the simulated type-level parameterized constructors include one or more type-level operations.

6. The method of claim 1, wherein the simulated type-level parameterized constructors simulate delegate objects over the interface instance.

7. The method of claim 1, wherein one or more simulated type-level parameterized constructors are matched with one or more native methods using signatures.

8. The method of claim 7, wherein the simulated type-level parameterized constructors and native methods are matched to detect the appropriate interface instance to dispatch method calls against.

9. The method of claim 1, wherein upon receiving a call to an interface method representing static members of a specified type, the separate typed object invokes the instance members of the specified type to satisfy the interface method call.

10. The method of claim 1, wherein the instance members comprise static members.

11. The method of claim 10, wherein the static members are simulated by the separate typed object.

12. The method of claim 10, wherein runtime attempts to execute the static members are redirected to the static members' associated interface instance.

13. The method of claim 12, wherein the redirection allows the runtime to simulate the presence of static members over the top of the interface instance that implements interface-based calls.

14. A computer program product comprising one or more hardware storage devices having stored thereon computer-executable instructions that are structured such that, when executed by one or more processors of a computing system, the computer-executable instructions configure the computing system to maintain a token-based event handling system, including computer-executable instructions that configure the computer system to perform at least the following:
    instantiate a table of event subscriptions for a plurality of programming objects, the table being configured to map one or more tokens to event subscribers and the events to which they are subscribed;
    maintain, at the table of event subscriptions, a weak reference to the subscriber for each of the event subscriptions, such that the subscriptions are tracked without the table of event subscriptions forcing the subscriber to stay alive, the table of event subscriptions being configured to track the event subscriptions even upon the subscriber being unresponsive, such that the event subscription table is removed from consideration for finalization by a runtime, allowing the table of event subscriptions to manage the lifetime of one or more callable wrappers configured to act as event sources, wherein the runtime is configured to maintain a strong reference to the event sources to prevent the event sources from being eligible for garbage collection;
    determine that at least one event no longer has any subscriptions; and
    based on the determination, remove the subscription from the table of event subscriptions.

15. The computer program product of claim 14, wherein reference counting is implemented in lieu of the weak reference.

16. The computer program product of claim 15, wherein the table of event subscriptions does not keep either the subscriber or the event alive.

17. The computer program product of claim 14, wherein the table of event subscriptions automatically removes itself upon detecting that there are no more subscriptions to track for a specified event.

18. A computer system comprising the following:
    one or more processors;
    system memory;
    one or more computer-readable storage media having stored thereon computer-executable instructions that are structured such that, when executed by the one or more processors, the computer-executable instructions configure the computing system to provide a simulation of a type-level construct on an interface instance, including computer-executable instructions that configure the computer system to perform at least the following:
        instantiate an interface instance comprising an instance object and one or more instance members;

instantiate a separate typed object which is configured to maintain one or more simulated type-level parameterized constructors, the simulated type-level parameterized constructors having associated parameters;

scan a plurality of interface instances to identify an interface instance that provides a method having a specified set of parameters, the identified method being matched to the parameters of the simulated type-level parameterized constructors to determine an appropriate interface instance to dispatch method calls against;

associate the instantiated interface instance with the separate typed object, wherein the separate typed object is configured to route method invocations for the identified method from the interface instance to one or more simulated type-level parameterized constructors and static members of the type; and simulate a type-level parameterized constructor by redirecting attempts to execute the static members to the static members' associated interface instance, the redirection allowing a runtime to simulate the presence of static members over the top of the interface instance associated with the separate typed object by at least:

identifying a callback method on the interface instance;

creating a delegate type with an invoke method that has an identical signature to a signature of the callback method;

upon determining that the delegate has been invoked, forwarding the callback method to an application binary interface (ABI) method; and returning the result of the callback method as the result of the delegate invocation, such that the runtime provides a delegate API experience over an interfaced ABI.

19. The computer system of claim 18, wherein one or more simulated type-level parameterized constructors are matched with one or more native methods using signatures to detect the appropriate interface instance to dispatch method calls against.

20. The computer system of claim 18, wherein the interface instance is implemented to simulate one or more type-level operations.

* * * * *